United States Patent [19]

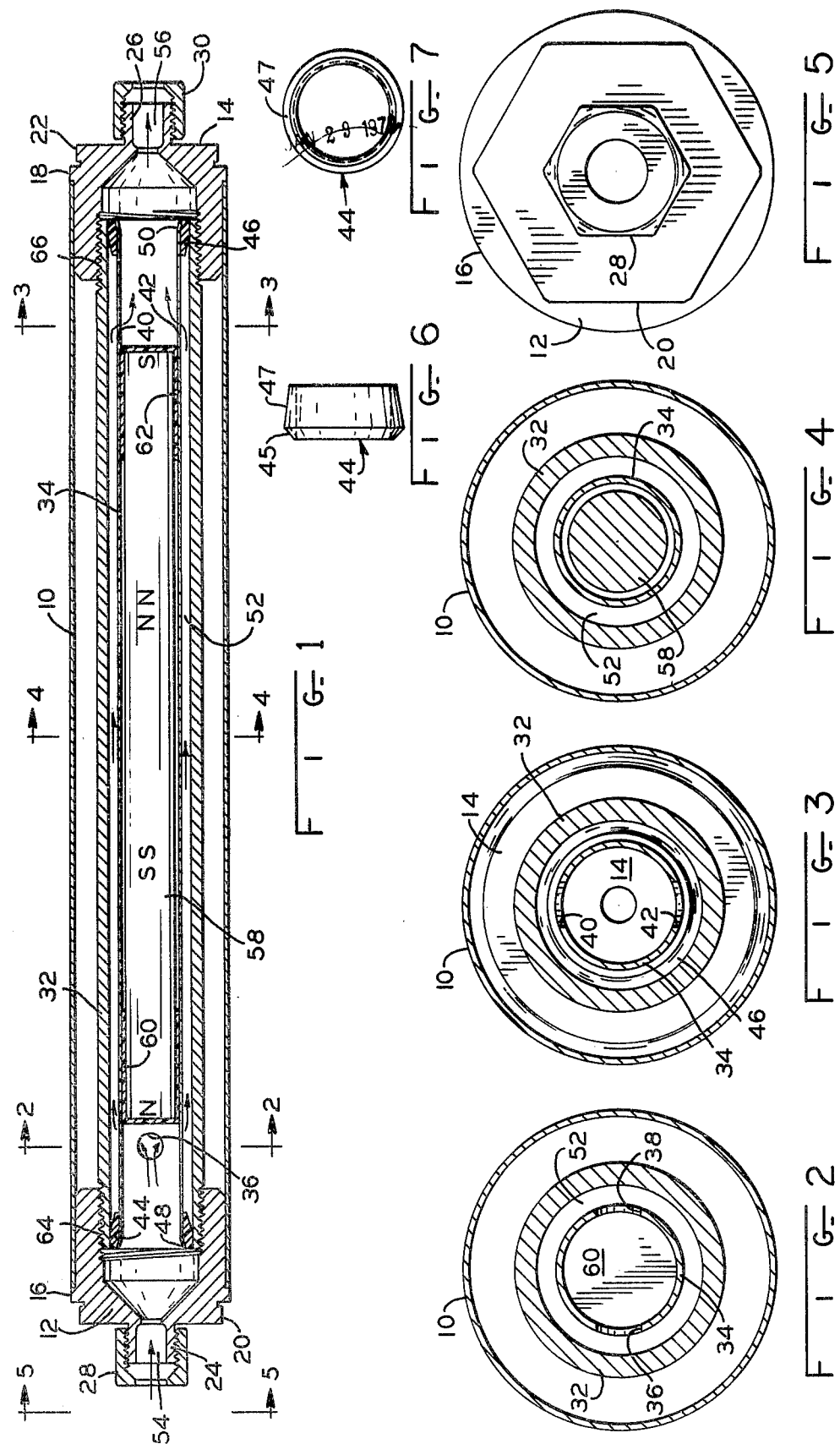

Sanderson

[11] 4,153,559
[45] May 8, 1979

[54] WATER TREATMENT DEVICE AND METHOD FOR MANUFACTURING SAME

[76] Inventor: Charles H. Sanderson, 3717 Fritcha Ave., Fort Wayne, Ind. 46806

[21] Appl. No.: 798,854

[22] Filed: May 20, 1977

[51] Int. Cl.² ............................................. B01D 35/06
[52] U.S. Cl. ..................................... 210/222; 29/450; 29/469; 29/523; 29/525
[58] Field of Search ................. 29/450, 451, 446, 469, 29/507, 523, 525; 210/222, 223; 209/221; 335/284; 317/201; 285/55, 138, 139

[56] References Cited
U.S. PATENT DOCUMENTS

| | | | |
|---|---|---|---|
| 1,975,269 | 10/1934 | Gray | 285/138 |
| 2,082,379 | 6/1937 | Buttam, Jr. | 29/525 |
| 2,268,263 | 12/1941 | Newell et al. | 285/138 |
| 2,616,729 | 11/1952 | Hansen | 285/138 |
| 2,690,842 | 10/1954 | Splurak | 210/222 X |
| 2,845,203 | 7/1958 | Potash | 29/451 |
| 2,939,830 | 6/1960 | Green et al. | 210/222 X |
| 3,137,066 | 6/1964 | Merino et al. | 285/55 X |
| 3,239,931 | 3/1966 | Guarnaschelli | 285/55 X |
| 3,244,438 | 4/1966 | Bucheit | 285/55 X |
| 3,319,328 | 5/1967 | Finger et al. | 29/450 |
| 3,349,354 | 10/1967 | Miyata | 210/222 |
| 3,669,274 | 6/1972 | Happ et al. | 210/222 |
| 3,680,705 | 8/1972 | Happ et al. | 210/222 |
| 3,922,008 | 11/1975 | Stiner et al. | 285/138 |
| 3,951,807 | 4/1976 | Sanderson | 210/222 |
| 4,085,950 | 4/1978 | Alewitz | 285/138 |

OTHER PUBLICATIONS

Brochure, Superior Water Conditioner, Superior M--Tow, Inc. Box 545, Fort Wayne, Indiana.
Brochure, Superior Water Conditioners, Kemtune Inc., P.O. Box 545, 2015 S. Calhoun St., Ft. Wayne, Ind., 1976.

Primary Examiner—Theodore A. Granger
Attorney, Agent, or Firm—Gust, Irish, Jeffers & Rickert

[57] ABSTRACT

A device for the magnetic treatment of water and other liquids, having a pair of concentric tubular casings which are spaced from each other so as to form an annular treatment chamber. The inner casing contains an elongated magnet having two or more longitudinally spaced poles, and the outer casing is made of a magnetic material which serves to concentrate the magnetic lines of force within the annular chamber. The inner casing is supported within the outer casing by means of elastic, non-magnetic sleeves which are positioned over opposite ends of the inner casing and compressed between it and the inner surface of the outer casing so that the treatment chamber is rendered fluid-tight and the inner casing and magnet are prevented from shifting longitudinally with respect to the outer casing.

The device is manufactured by pressing resilient end caps on opposite ends of the magnet and pressing this assembly into the inner casing, inserting the inner casing in the outer casing and then wedging the sleeves between them.

11 Claims, 7 Drawing Figures

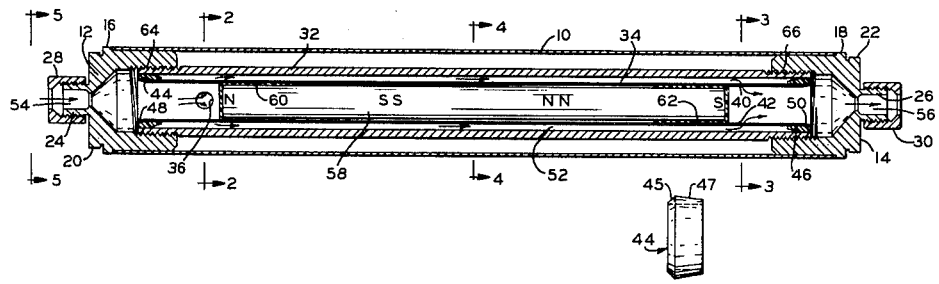

WATER TREATMENT DEVICE AND METHOD FOR MANUFACTURING SAME

BACKGROUND OF THE INVENTION

The present invention relates to a device for the treatment of water to reduce the buildup of scale and in particular to a device wherein the water is subjected to a magnetic field as it pases through an annular, elongated treatment chamber.

A problem which is quite prevalent in systems and apparatus which use large amounts of water, such as boilers, dishwashers, ice machines, and the like, is that of scale buildup on the surfaces which come into contact with the water. This is especially troublesome in areas where the water has a high mineral content so that it is necessary for the water to be "conditioned" either by chemical action or by magnetic water treatment devices of the general type to which the resent invention relates.

One such magnetic treatment device is disclosed inU.S. Pat. No. 3,951,807 to Charles H. Sanderson and comprises an elongated magnet having a multiplicity of longitudinally spaced poles encased in a non-magnetic jacket and concentrically positioned within a galvanized outer casing made of a magnetic material. The jacketed magnet is centered by means of a pair of stepped collars secured thereto which in turn are centered by means of a pair of flared inserts.

U.S. Pat. No. 2,690,842 teaches a fuel line cleaner device having an elongated magnet enclosed within a tubular casing threaded on both ends to receive a pair of fittings, which in turn are provided with supporting webs formed of non-magnetic material having threaded hub portions centrally supported by a pair of spaced members. The magnet is threaded at each end and engages the respective hub portions of the supporting webs so that it is centrally supported within the enclosure.

Another magnetic water treatment device, one which is presently commercially available, comprises an outer casing of magnetic material, an intermediate casing made of plastic and an elongated permanent magnet encased within a plastic jacket having helical vanes which support the magnet centrally within the intermediate casing. Non-magnetic end caps are threadedly secured to opposite ends of the intermediate casing and O-rings are compressed between flanges on the end caps and the outer casing.

Magnetic treatment devices generally of this type are well known and prevent the buildup of scale by causing the calcium and other minerals present in hard water to form, instead, a loose slurry which can be easily removed from the system by blowdown or flusing. In many applications such as furnace humidifiers, for example, it is necessary that the device be contained within a fairly small housing and for this reason, available space is at a premium. The effectiveness with which the water is treated depends on the intensity of the magnetic field within the treating chamber and the effective length of the chamber itself. Accordingly, it is desirable that the chamber be free of any obstructions which may occupy otherwise available treatment space, and for the water to be directed into and completely occupy the annular treatment chamber as quickly and in as short a distance as possible after it enters the device.

A further consideration is that the strength of the magnetic field produced by the magnetic be confined solely to the annular treatment chamber so that all of the available flux will be utilized. An important factor in assuring this situation is to completely magnetically isolate the magnet from the supporting structure and to complete the magnetic circuit by means of a ferrous casing which surrounds the magnet and which is also magnetically insulated from its supporting structure and from the magnet.

SUMMARY OF THE INVENTION

The present invention overcomes the disadvantages of the prior art magnetic water treatment devices in that the magnet structure is centrally supported within the ferrous casing by means of a pair of non-magnetic, elastic rings compressed between and in frictional engagement with the magnet structure and the ferrous casing at opposite ends thereof. Additionally, the magnet is frictionally retained within its jacket by a pair of plastic end caps which further insulate the magnet and also serve to prevent water from coming into contact with it thereby causing corrosion.

Specifically, the present invention contemplates a device for the treatment of water comprising: an elongated tubular casing of magnetic material having an inner surface, an elongated magnet having at least two longitudinally spaced poles, a fluid-tight jacket of non-magnetic material completely encasing the magnet and including an outer peripheral surface extending longitudinally with respect thereto, the jacket including open tubular end portions extending beyond opposite ends of the magnet, the jacket and magnet being positioned longitudinally within the casing and being spaced therefrom so as to form an annular chamber between the casing inner surface and the jacket outer surface, a pair of elastic rings of non-magnetic material being positioned over opposite ends of the jacket and compressed between the jacket outer surface and the tubular casing inner surface, the rings being in tight frictional engagement with the jacket and tubular casing, an aperture in each of the tubular end portions extending into the annular chamber, and fluid inlet and outlet fittings secured to opposite ends of the casing.

It is an object of the present invention to provide a magnetic water treatment device wherein the magnet is magnetically insulated from the supporting structure.

It is also an object of the present invention to provide a magnetic water treatment device wherein the magnet is supported at opposite ends thereof so that the annular treatment chamber is substantially free of obstructions and maximum subjection of the flowing water to the magnetic field is achieved.

Another object of the present invention is to provide a magnetic water treatment device wherein soldering and welding are eliminated by virtue of the frictional engagement between the various elements.

A further object of the present invention is to provide a magnetic water treatment device wherein the water is caused to enter the annular chamber at a point proximate to the end of the magnet.

A still further object of the present invention is to provide a magnetic water treatment device which is relatively simple in construction and capable of being rapidly and efficiently manufactured.

These and other objects and features of the present invention will become more apparent from the following description taken together with the accompanying drawing.

BRIEF DESCRIPTION OF THE DRAWINGS

FIG. 1 is a longitudinal sectional view of the magnetic water treatment device according to the present invention;

FIG. 2 is a transverse sectional view thereof taken along line 2—2 and viewed in the direction of the arrows;

FIG. 3 is a transverse sectional view thereof taken along line 3—3 and viewed in the direction of the arrows;

FIG. 4 is a transverse sectional view thereof taken along line 4—4 and viewed in the direction of the arrows;

FIG. 5 is an end view thereof taken along line 5—5 and viewed in the direction of the arrows; and FIGS. 6 and 7 are detail views of the centering sleeves.

DESCRIPTION OF THE PREFERRED EMBODIMENT

Referring now to the drawing, the device according to the present invention comprises an outer casing 10 of a non-magnetic material such as copper and a pair of substantially identical fluid fittings 12 and 14 also of a non-magnetic material such as brass. Fittings 12 and 14 are provided with flanges 16 and 18, respectively, which abut opposite ends of outer casing 10. Hexagonal heads 20 and 22 permit fittings 12 and 14 to be tightened by means of a standard wrench and adaptors 24 and 26 are threaded so as to receive standard compression fittings 28 and 30 for the purpose of connecting the device in a copper water line.

For purposes of the present description, "non-magnetic" means materials having a very low magnetic permeability and virtually no ferromagnetic characteristics, such as copper, brass, PVC, nylon and Delrin, for example. "Magnetic" materials are those exhibiting high magnetic permeability such as iron and steel.

A tubular intermediate casing 32 of a ferromagnetic material having a high magnetic permeability such as galvanized iron or steel is threadedly connected to fittings 12 and 14. Casing 32 has an outer diameter less than the inner diameter of outer casing 10 and is uniformly spaced therefrom by fittings 12 and 14. Positioned within casing 32 is a tube 34 of non-magnetic material, such as copper, which is open at both ends and has a pair of apertures 36, 38 and 40, 42 therein. Apertures 36 and 38 are transversely aligned along an axis which is rotated 90 degrees from the axis along which apertures 40 and 42 are aligned. This causes the water which enters one end of the device to make a 90 degree turn about the longitudinal axis before it exits from the opposite end.

Tube or casing 34 is centered within ferrous casing 32 by means of a pair of rings or sleeves 44 and 46 which are positioned around opposite ends 48 and 50 thereof and tightly compressed between it and ferrous casing 32. Sleeves 44 and 46 have a relatively high coefficient of elasticity and may be made of nylon, Teflon, or any other material which is non-magnetic, i.e. has a very low magnetic permeability, and has sufficient elasticity to generate the frictional forces required to prevent casings 34 and 32 from shifting longitudinally relative to each other. In a preferred form of the invention, sleeves 44 and 46 are made of Delrin, which is an acetal resin produced by E. I. du Pont de Nemours & Co. Delrin sleeves of this type are available from Essex Wire Corp., Columbia City, Ind., among others. As illustrated, sleeves 44 and 46 have chamfered external surfaces 45 and 47 which facilitates their insertion during manufacturing. The ends 48 and 50 of casing 34 may be flared outwardly. Inner casing 34 is spaced from ferrous casing 32 by sleeves 44 and 46 so as to form therebetween an annular chamber 52 which is in fluid communication with inlet 54 and outlet 56 through apertures 36, 38 and 40, 42 respectively.

Retained within inner casing 34 is an elongated permanent magnet 58 preferably having a composition of cobalt, nickel, aluminum, copper and iron, and magnetized along its longitudinal axis to have a plurality of longitudinally spaced-apart poles of alternating polarity represented by the symbols "N" and "S". The magnet 58 is substantially homogeneous in composition and, in the embodiment illustrated, comprises three magnetic domains extending transversely throughout the magnet and having their magnetic moments alternately oppositely aligned such that alternating North and South poles exist. A magnet such as this may be produced by imposing on a bar of magnetic material three longitudinally displaced static magnetic fields of alternating polarity. The number of poles for a particular magnet depends to a great extent on the size of the device and of the gallon per hour capacity so that in the case of a very small capacity device, a magnet having only two poles may be the most efficient.

Magnet 58 is provided with a pair of resilient plastic end caps 60 and 62 which are compressed between it and inner casing 34 so as to frictionally retain magnet 58 in place. End caps 60 and 62 are of a non-magnetic material and additionally serve to space magnet 58 from inner casing 34 thereby magnetically insulating it.

The structure described above is designed to concentrate the magnetic field produced by magnet 58 into the annular chamber 52 immediately adjacent thereto and at the same time insulate this field from the supporting structure and any external ferromagnetic objects which may come into contact with the device. Due to the high permeability of the casing 32, the flux lines produced by magnet 58 will extend radially outward therefrom, pass through casing 34 and return to magnet 58 without straying from chamber 52. By thus containing the magnetic field, maximum efficiency in subjecting the water flowing through the device to the magnetic field is achieved. Containment of the magnetic field is further enhanced through the use of non-magnetic materials for the outer casing 10, fittings 12 and 14 and sleeves 44 and 46. Plastic end caps 60 and 62 assist in preventing premature magnetic shorting of the field prior to its passing through chamber 52.

In use, the device is connected within a water line supplying the apparatus in which scale buildup is to be prevented by means of compression fittings 28 and 30. Obviously, other types of fittings may be employed depending on the particular application. As indicated by arrows in FIG. 1, the water flows through inlet 54 and apertures 36 and 38 into annular chamber 52 whereupon it is subjected to the magnetic field produced by magnet 58, and from there it flows through apertures 40 and 42 and outlet 56.

In an exemplary form of the present invention, outer casing 10 is made of copper and fittings 12 and 14 are of brass. Casing 32 is a threaded galvanized ½ inch steel pipe with an inner diameter of 0.633 in. and inner copper casing 34 has an outer diameter of 0.500 in. and an inner diameter of 0.400 in. Delrin sleeves 44 and 46 are 0.250 in. in length, have an outer diameter of 0.687 in. and an inner diameter of 0.500 in. Magnet 58 is 0.375 in. in diameter, 6 in. in length and the pole spacing is 1.75 in. End caps 60 and 62 are 0.005 in. thick.

The device is assembled as follows. End caps 60 and 62 are first pressed over opposite ends of magnet 58 and this assembly, which has a larger diameter than the inner diameter of casing 34 due to caps 60 and 22, is pressed inside casing 34. Casing 34 is then positioned within ferromagnetic casing 32, which has the same length as casing 34, and the tapered Delrin sleeves are wedged between casings 32 and 34 at the ends thereof. The inner diameter of casing 32 is slightly smaller than the outer diameter of Delrin sleeves 44 and 46 but the tapered surfaces of the sleeves permit insertion without sacrificing the tight fit between them and the casings 32 and 34. After the sleeves 44 and 46 are in place, the ends 48 and 50 of inner casing 34 are swaged to flare them outwardly so that sleeves 44 and 46 fit tightly on casing 34. The outer casing 10 is then placed over casing 32 and the fittings 12 and 14 are screwed onto casing 32. The threaded portions 64 and 66 of casing 32 are tapered slightly so that as fittings 12 and 14 are screwed thereon, it has a tendency to narrow slightly in diameter thereby clamping sleeves 44 and 46 even more tightly.

Although the device has been shown and described as having an overall shape which is symetrical about a straight axis, it should be noted that other configurations are not excluded. Furthermore, magnet 58 is preferably made of a material having a high energy product and high retentivity and coercivity such as an Alnico material. While casing 32 is preferably made of galvanized iron or steel, it may be of any material having good ferromagnetic properties and high permeability, which provides a good path for completing the magnetic circuit produced by magnet 58 thereby concentrating the magnetic field within annular chamber 52.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the appended claims.

What is claimed is:

1. A device for the treatment of water comprising:
   a one-piece elongated tubular casing of magnetic material, said casing having an inner surface,
   an elongated magnet having at least two longitudinally spaced poles,
   a one-piece fluid-tight jacket of non-magnetic material completely encasing said magnet, said jacket including an outer peripheral surface extending longitudinally with respect thereto,
   said jacket including open tubular end portions extending beyond opposite ends of said magnet,
   said jacket and magnet being positioned longitudinally within said casing,
   means for supporting said jacket within said casing and spacing said jacket from said casing inner surface so as to form an annular chamber therebetween, said means for supporting comprising a pair of tapered elastic sleeves of non-magnetic material being positioned over opposite ends of said jacket between said jacket and said casing,
   the ends of said jacket being flared outwardly so as to tightly compress said sleeves between the flared ends of said jacket and the inner surface of said casing, said sleeves being in tight frictional engagement with said casing and the flared ends of said jacket,
   an aperture in each of said tubular end portions extending into said annular chamber,
   first and second fluid fittings threadedly secured respectively to opposite ends of said casing, each said fitting being an integral unit comprising a hollow cylindrical portion having a reduced diameter portion and a shoulder adjacent said reduced diameter portion, and
   an outer tubular casing of non-magnetic material positioned around said first mentioned casing and telescopically supported on its opposite ends by the reduced diameter portions of said fittings, said shoulders engaging the ends of said outer casing so as to center said outer casing between said fittings.

2. The device of claim 1 wherein said shoulders are annular.

3. The device of claim 1 including a pair of resilient end caps positioned over opposite ends of said magnet and compressed between said jacket and said magnet, said end caps spacing said magnet radially from said jacket.

4. The device of claim 1 wherein said fluid fittings are integral units of non-magnetic material.

5. The device of claim 1 wherein said apertures are spaced longitudinally from said magnet.

6. The device of claim 5 including a second aperture in each of said jacket end portions positioned opposite said first-mentioned apertures, respectively, and wherein the apertures in one of said end portions are offset 90 degrees from the apertures in the other of said end portions.

7. The device of claim 1 wherein said sleeves include tapered outer surfaces.

8. The device of claim 1 wherein:
   said jacket comprises a non-magnetic metallic tube and a pair of flexible end caps positioned over opposite ends of said magnet,
   said magnet is radially spaced from said metallic tube along its entire length.

9. The device of claim 1 wherein said magnet is magnetized along its longitudinal axis and consists of at least two adjacent magnetic domains positioned along its longitudinal axis which extend transversely throughout said magnet and have opposing magnetic moments such that there exists at least three longitudinally spaced apart sections of alternating North and South polarity.

10. The method of manufacturing a magnetic water treatment device comprising:
   providing an elongated bar magnet,
   pressing resilient end caps on opposite ends of the magnet,
   providing a tubular inner casing of non-magnetic material and pressing the magnet and end caps longitudinally within the inner casing wherein the end caps are compressed between the magnet and inner casing so that the magnet is frictionally retained in the casing,
   providing a tubular intermediate casing of magnetic material and inserting the inner casing longitudinally therein, providing a pair of elastic sleeves, each sleeve having a tapered end, wedging said elastic sleeves, tapered ends first, concentrically between the inner and intermediate casings at the opposite ends thereof so as to center the inner casing within the intermediate casing, and flaring the ends of the inner casing outwardly against the sleeves so as to compress the sleeves between the flared ends of the inner casing and the intermediate casing.

11. The method of claim 10 including:

inserting the assembly of claim 10 within a tubular outer casing, and threading a pair of fluid fittings on the opposite ends, respectively, of the intermediate casing axially against the outer casing.

* * * * *